United States Patent
Song et al.

(10) Patent No.: US 9,988,048 B1
(45) Date of Patent: Jun. 5, 2018

(54) LANE DETECTION SYSTEMS AND METHODS

(71) Applicant: GM Global Technology Operations LLC, Detroit, MI (US)

(72) Inventors: Xiaofeng F. Song, Novi, MI (US); Valor Yaldo, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/448,730

(22) Filed: Mar. 3, 2017

(51) Int. Cl.
*B60W 30/12* (2006.01)
*B60R 1/06* (2006.01)
*B60R 1/12* (2006.01)
*B60W 50/14* (2012.01)

(52) U.S. Cl.
CPC ............. *B60W 30/12* (2013.01); *B60R 1/06* (2013.01); *B60R 1/12* (2013.01); *B60W 50/14* (2013.01); *B60R 2001/1253* (2013.01); *B60W 2050/143* (2013.01); *B60W 2420/42* (2013.01); *B60W 2520/06* (2013.01); *B60W 2710/0622* (2013.01); *B60W 2710/18* (2013.01); *B60W 2710/20* (2013.01); *B60W 2710/30* (2013.01); *B60W 2720/24* (2013.01)

(58) Field of Classification Search
None
See application file for complete search history.

(56) References Cited

U.S. PATENT DOCUMENTS

| | | | | |
|---|---|---|---|---|
| 2004/0016870 A1* | 1/2004 | Pawlicki | ............ | B60K 31/0008 250/208.1 |
| 2008/0291000 A1* | 11/2008 | Kim | ............ | B60Q 9/008 340/436 |
| 2009/0296987 A1* | 12/2009 | Kageyama | ......... | G06K 9/00798 382/103 |
| 2010/0030430 A1* | 2/2010 | Hayakawa | .......... | B60T 8/17557 701/42 |
| 2010/0189306 A1* | 7/2010 | Kageyama | ......... | G06K 9/00798 382/104 |
| 2012/0072080 A1* | 3/2012 | Jeromin | ................. | B60Q 1/143 701/49 |
| 2012/0271539 A1* | 10/2012 | Bald | ................. | B60W 50/0097 701/300 |
| 2013/0293717 A1* | 11/2013 | Zhang | .................... | H04N 7/181 348/149 |

(Continued)

*Primary Examiner* — Jonathan M Dager

(57) ABSTRACT

A lane detection method includes: identifying locations of a lane line included in a first image captured using a first camera capturing images beside the vehicle, the first camera being mounted to a mirror that is movable; based on the locations of the lane line, determining a first linear equation corresponding to the lane line; determining a distance to the lane line based on the first linear equation; identifying locations of the lane line included in a second image captured using a second camera capturing images in front of the vehicle; based on the locations of the lane line, determining a second linear equation corresponding to the lane line; based on the first and second linear equations, determining an angle between first and second lines corresponding to the first and second linear equations, respectively; and determining a corrected distance to the lane line based on the distance and the angle.

20 Claims, 7 Drawing Sheets

(56) References Cited

U.S. PATENT DOCUMENTS

| | | | |
|---|---|---|---|
| 2014/0092237 A1* | 4/2014 | Watanabe | B60R 1/00 |
| | | | 348/118 |
| 2015/0154459 A1* | 6/2015 | Park | G06K 9/00798 |
| | | | 382/104 |
| 2015/0329048 A1* | 11/2015 | Wang | G06T 7/80 |
| | | | 348/148 |
| 2015/0332114 A1* | 11/2015 | Springer | G06K 9/4604 |
| | | | 348/148 |
| 2016/0148062 A1* | 5/2016 | Fursich | B60R 1/00 |
| | | | 348/36 |
| 2017/0129489 A1* | 5/2017 | Pawlicki | B60W 30/18 |
| 2017/0278400 A1* | 9/2017 | Ferguson | G08G 1/166 |
| 2017/0334455 A1* | 11/2017 | Asakura | B60W 50/082 |
| 2017/0364082 A1* | 12/2017 | Taieb | G05D 1/0219 |
| 2017/0371344 A1* | 12/2017 | Cohen | G05D 1/0246 |
| 2017/0371345 A1* | 12/2017 | Cohen | G05D 1/0246 |
| 2017/0371347 A1* | 12/2017 | Cohen | G05D 1/0253 |

\* cited by examiner

LANE DETECTION SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to lane identification systems and methods.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver. Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, a lane detection system of a vehicle is described. A first line module is configured to: identify locations of a lane line included in a first image captured using a first camera capturing images outside of and beside the vehicle, where the camera is mounted to an outside rear view mirror that is movable about a fixed pivot point; based on the locations of the lane line included in the first image, determine a first linear equation corresponding to the lane line; and determine a distance to the lane line based on the first linear equation. A second line module is configured to: identify locations of the lane line included in a second image captured using a second camera capturing images outside of and in front of the vehicle; and based on the locations of the lane line included in the second image, determine a second linear equation corresponding to the lane line. An angle module is configured to, based on the first and second linear equations, determine an angle between first and second lines corresponding to the first and second linear equations, respectively. A correction module is configured to determine a corrected distance to the lane line based on the distance and the angle.

In further features, a third line module is configured to: identify locations of a second lane line included in a third image captured using a third camera capturing images outside of and beside the vehicle, where the camera is mounted to an second outside rear view mirror that is movable about a second fixed pivot point; based on the locations of the second lane line included in the third image, determine a third linear equation corresponding to the second lane line; and determine a second distance to the second lane line based on the third linear equation. The second line module is further configured to: identify locations of the second lane line included in the second image captured using the second camera; and based on the locations of the second lane line included in the second image, determine a fourth linear equation corresponding to the second lane line. A second angle module is configured to, based on the third and fourth linear equations, determine a second angle between third and fourth lines corresponding to the third and fourth linear equations, respectively; and a second correction module is configured to determine a second corrected distance to the second lane line based on the second distance and the second angle.

In further features, a steering control module is configured to selectively adjust a steering actuator of the vehicle based on the corrected distance.

In further features, a mirror control module is configured to selectively move the outside rear view mirror about the fixed pivot point based adjusting on the angle between first and second lines corresponding to the first and second linear equations, respectively, toward zero.

In further features, an engine control module is configured to selectively adjust an engine actuator of the vehicle based on the corrected distance.

In further features, a brake control module is configured to selectively adjust application of friction brakes of the vehicle based on the corrected distance.

In further features, the second line module is configured to determine the second linear equation further based on an expected location of the first camera.

In further features, the second line module is configured to determine the second linear equation further based on a delay period between when a portion of the lane line is included in the second image and when the portion of the lane line is included in the first image.

In further features, the first line module is configured to determine the distance to the lane line further based on a predetermined distance between a side of the vehicle and a location of the first camera.

In further features, a driver warning module is configured to, based on the corrected distance, selectively generate at least one of an audible, a visual, and a tactile output.

In a feature, a lane detection method for a vehicle includes: identifying locations of a lane line included in a first image captured using a first camera capturing images outside of and beside the vehicle, where the camera is mounted to an outside rear view mirror that is movable about a fixed pivot point; based on the locations of the lane line included in the first image, determining a first linear equation corresponding to the lane line; determining a distance to the lane line based on the first linear equation; identifying locations of the lane line included in a second image captured using a second camera capturing images outside of and in front of the vehicle; based on the locations of the lane line included in the second image, determining a second linear equation corresponding to the lane line; based on the first and second linear equations, determining an angle between first and second lines corresponding to the first and second linear equations, respectively; and determining a corrected distance to the lane line based on the distance and the angle.

In further features, the lane detection method further includes: identifying locations of a second lane line included in a third image captured using a third camera capturing images outside of and beside the vehicle, where the camera is mounted to an second outside rear view mirror that is movable about a second fixed pivot point; based on the locations of the second lane line included in the third image, determining a third linear equation corresponding to the second lane line; determining a second distance to the second lane line based on the third linear equation; identifying locations of the second lane line included in the second image captured using the second camera; based on the locations of the second lane line included in the second image, determining a fourth linear equation corresponding to the second lane line; based on the third and fourth linear equations, determining a second angle between third and fourth lines corresponding to the third and fourth linear equations, respectively; and determining a second corrected distance to the second lane line based on the second distance and the second angle.

In further features, the lane detection method further includes selectively adjusting a steering actuator of the vehicle based on the corrected distance.

In further features, the lane detection method further includes selectively moving the outside rear view mirror about the fixed pivot point based adjusting on the angle between first and second lines corresponding to the first and second linear equations, respectively, toward zero.

In further features, the lane detection method further includes selectively adjusting an engine actuator of the vehicle based on the corrected distance.

In further features, the lane detection method further includes selectively adjusting application of friction brakes of the vehicle based on the corrected distance.

In further features, determining the second linear equation includes determining the second linear equation further based on an expected location of the first camera.

In further features, determining the second linear equation includes determining the second linear equation further based on a delay period between when a portion of the lane line is included in the second image and when the portion of the lane line is included in the first image.

In further features, determining the distance to the lane line includes determining the distance to the lane line further based on a predetermined distance between a side of the vehicle and a location of the first camera.

In further features, the lane detection method further includes, based on the corrected distance, selectively generating at least one of an audible, a visual, and a tactile output.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Autonomous and some semi-autonomous driving systems maintain a vehicle between left and right lane lines. A vehicle may include forward facing and side facing cameras to capture images and determine locations of the left and right lane lines. The side facing cameras may be mounted to outside rear view mirrors of the vehicle. Outside rear view mirrors may be moveable around a fixed pivot point.

A first equation (e.g., a linear equation) representative of the left lane line may be generated based on locations of the left lane line in one or more images from the forward facing camera. A second equation (e.g., a linear equation) representative of the left lane line may also be generated based on locations of the left lane line in one or more images from the side facing camera imaging the area to the left of the vehicle. The same may be performed for the right lane based on the images from the forward facing camera and images from the side facing camera imaging the area to the right of the vehicle.

When a deviation (e.g., angle) between the first and second equations is greater than a predetermined value, lane line detection and/or vehicle control based on the detected lane lines may be disabled. This is because a distance to the lane line determined based on the images from the side facing camera may appear to be greater than the distance actually is when the deviation is greater than the predetermined value.

Since the outside rear view mirrors are moveable, movement of the mirrors may cause deviation greater than the predetermined value. For example, physical contact with an outside rear view mirror (e.g., by a car wash, by a human, by another car, etc.) may cause deviation greater than the predetermined value.

According to the present application, a lane boundary detection module determines distances to the right and left lane lines based on images from the side facing cameras. The distances may be, for example, distances between the side facing cameras and the left and right lane lines or distances between left and right sides of the vehicle and the left and right lane lines. The lane boundary detection module corrects the distances based on deviation between the first and second equations. The corrected distances can be used such that lane detection can continue and vehicle control can continue based on the detected lane lines.

Figure 1:
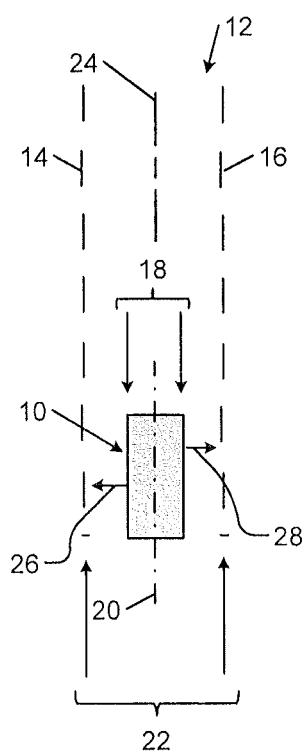
FIG. 1 includes an example view from above a vehicle between left and right lane lines.

Referring to FIG. 1, a vehicle 10 is shown travelling within a lane 12 having a left boundary 14 and a right boundary 16. The vehicle 10 has a width 18 and a longitudinal axis 20, and the lane 12 has a width 22 and a centerline 24 disposed at a midpoint of the width 22.

The longitudinal axis 20 of the vehicle 10 is aligned with the centerline 24 of the lane 12 in the example of FIG. 1. Thus, a distance 26 from the left side of the vehicle 10 to the left boundary 14 is equal to a distance 28 from the right side of the vehicle 10 to the right boundary 16.

Figure 2:
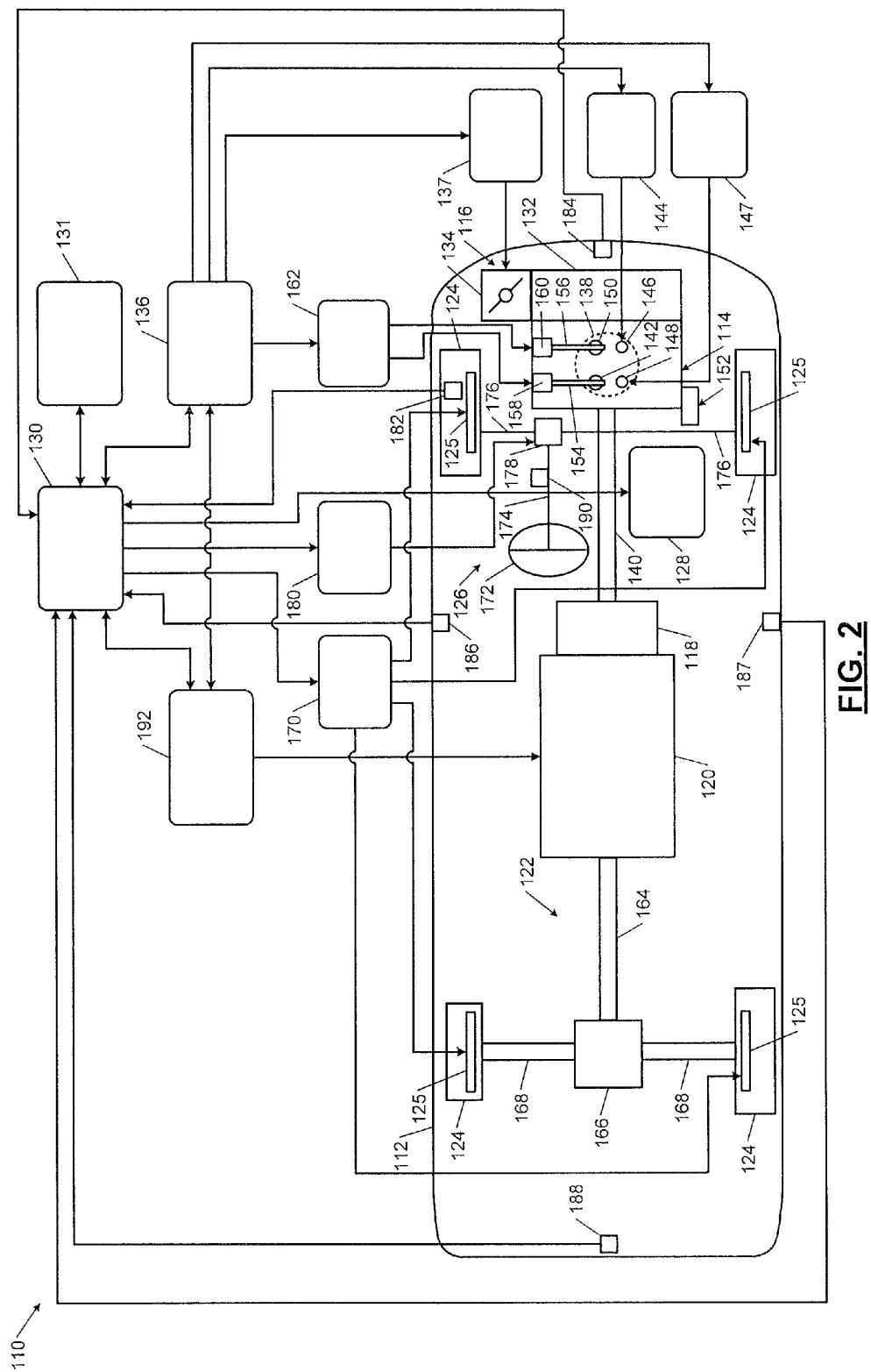
FIG. 2 is a functional block diagram of an example vehicle system.

Referring now to FIG. 2, a vehicle 110 includes a vehicle body 112, an engine 114, an intake system 116, a torque converter 118, a transmission 120, a driveline 122, wheels 124, friction brakes 125, a steering system 126, and a driver warning device 128. The engine 114 combusts an air/fuel mixture to produce drive torque for the vehicle 110. The amount of drive torque produced by the engine 114 is based on a driver input and/or a first input from a driving control module (DCM) 130. The driver input may be a signal indicating a position of an accelerator pedal. The first input from the DCM 130 may be a target vehicle acceleration.

The DCM 130 may adjust the target vehicle acceleration to maintain a target vehicle speed and/or to maintain a predetermined following distance relative to an object in front of the vehicle 110. The DCM 130 may determine the target vehicle speed based on the location of the vehicle 110 and a government speed limit for the road on which the vehicle 110 is travelling. The DCM 130 may determine the speed limit, for example, based on an input received from a global positioning system (GPS) module 131 or by identifying the speed limit posted on a speed limit sign from an image captured using a camera. The GPS module 131 may be onboard (e.g., part of) the vehicle 110 or the GPS module 131 may be remote from (e.g., separate from) the vehicle 110. The GPS module 131 includes a transceiver for communicating with a GPS satellite.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, which regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injections performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders.

Generating the spark may be referred to as a firing event. The spark actuator module 147 may have the ability to vary the timing of the spark for each firing event. The spark actuator module 147 may even be capable of varying the spark timing for a next firing event when the spark timing signal is changed between a last firing event and the next firing event. In various implementations, the engine 114 may include multiple cylinders and the spark actuator module 147 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114. The ECM 136 determines the target engine torque based on the driver input and/or the first input from the DCM 130. The ECM 136 may determine whether to determine the target engine torque based on the driver input or the first input based on a second input from the DCM 130. The DCM 130 may control whether the ECM 136 uses the driver input or the first input to determine the target engine torque based on whether the driver's foot is on the accelerator pedal. The DCM 130 may determine that the driver's foot is on the accelerator pedal when the accelerator pedal position indicates a pedal depression level that is greater than a predetermined amount.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when the friction brakes 125 are applied. The friction brakes 125 may include drum brakes and/or disc brakes, and may include electrohydraulic actuators and/or electromechanical actuators that press a brake pad against a brake disc and/or drum when the friction brakes 125 are applied. A brake actuator module 170 applies the friction brakes 125 based on a brake pedal position and/or a signal from the DCM 130. The friction brakes 125 may be independently applied at different levels. The DCM 130 may apply the friction brakes 125, for example, to maintain the target vehicle speed and/or to maintain the predetermined following distance relative to an object in front of the vehicle 110.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. Steering systems where the steering column 174 is not be coupled to the steering linkages 176 may be referred to as a steer-by-wire system.

A steering actuator module 180 adjusts actuation of the steering actuator 178 based on a signal from the DCM 130. The DCM 130 may control the steering actuator 178 based on the angular position of the steering wheel 172. Alternatively, the DCM 130 may control the steering actuator 178 autonomously (e.g., independent of the angular position of the steering wheel 172). For example, the DCM 130 may control the steering actuator 178 to minimize a difference between a target path of the vehicle 110 and an actual path of the vehicle 110 or to center the vehicle 110 between lane lines.

One or more wheel speed sensors 182 are mounted to one or more of the wheels 124 and measures the speed of wheels 124, respectively. For example, one wheel speed sensor may be provided for each wheel and measure that wheels wheel speed.

A forward facing camera 184 is mounted to capture images of in front of the vehicle body 112 and generates an image of the environment in front of the vehicle 110. The forward facing camera 184 may be located, for example, in a front fascia of the vehicle 110, as exemplified in FIG. 2. the forward facing camera 184, however, may be located elsewhere, such as with a rear view mirror inside of a front wind shield of the vehicle or at another suitable location to capture images of in front of the vehicle 110.

Side facing cameras 186 and 187 are mounted to the left and right sides of the vehicle body 112 and generate images of the environment on the left and right sides of the vehicle 110, respectively. As discussed further below, the side facing cameras 186 and 187 may be implemented under left and right outside rear view mirrors, respectively, of the vehicle.

An accelerometer may be mounted to (e.g., the rear of) the vehicle body 112 and measures the lateral, longitudinal, and/or vertical acceleration of the vehicle 110. The accelerometer may include a triaxial accelerometer, a dual-axis accelerometer, and/or one or more single-axis accelerometers. In one example, the accelerometer is a dual-axis accelerometer that measures the lateral and longitudinal acceleration of the vehicle 110.

A steering wheel angle sensor 190 measures the angular position of the steering wheel 172 relative to a predetermined position. The predetermined position may correspond to a location where the vehicle should (or does) travel straight along a longitudinal axis of the vehicle. The steering wheel angle sensor 190 may be mounted to the steering column 174 and may include, for example, a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the speed of the vehicle 110, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven (i.e., non-driven) wheels of the vehicle. The TCM 192 may receive the target vehicle acceleration and/or the target engine torque from the DCM 130 and/or the ECM 136. The ECM 136 may communicate with the TCM 192 to coordinate shifting gears in the transmission 120. For example, the ECM 136 may reduce engine torque during a gear shift.

The DCM 130 may adjust the target path of the vehicle 110 to maintain the vehicle 110 within the boundaries of a lane in which the vehicle 110 is travelling. The DCM 130 may repeatedly determine the trajectory (e.g., the future path) of the vehicle 110 and identify potential lane departures based on the vehicle trajectories. The DCM 130 may activate the driver warning device 128 to notify the driver of a potential lane departure.

The driver warning device 128 may include an electronic display (e.g., a touchscreen display) that is within the view of the driver and is operable to display lights, text, and/or images. Additionally or alternatively, the driver warning device 128 may include a heads-up display (HUD) that, for example, projects light, text, and/or images onto a windshield (not shown) of the vehicle 110. Additionally or alternatively, the driver warning device 128 may include one or more vibrators mounted to, for example, the steering wheel 172 and/or the driver's seat (not shown) to provide haptic feedback to the driver. Additionally or alternatively, the driver warning device 128 may include a speaker that is operable to generate a sound or audible message within the vehicle 110.

Figure 3:
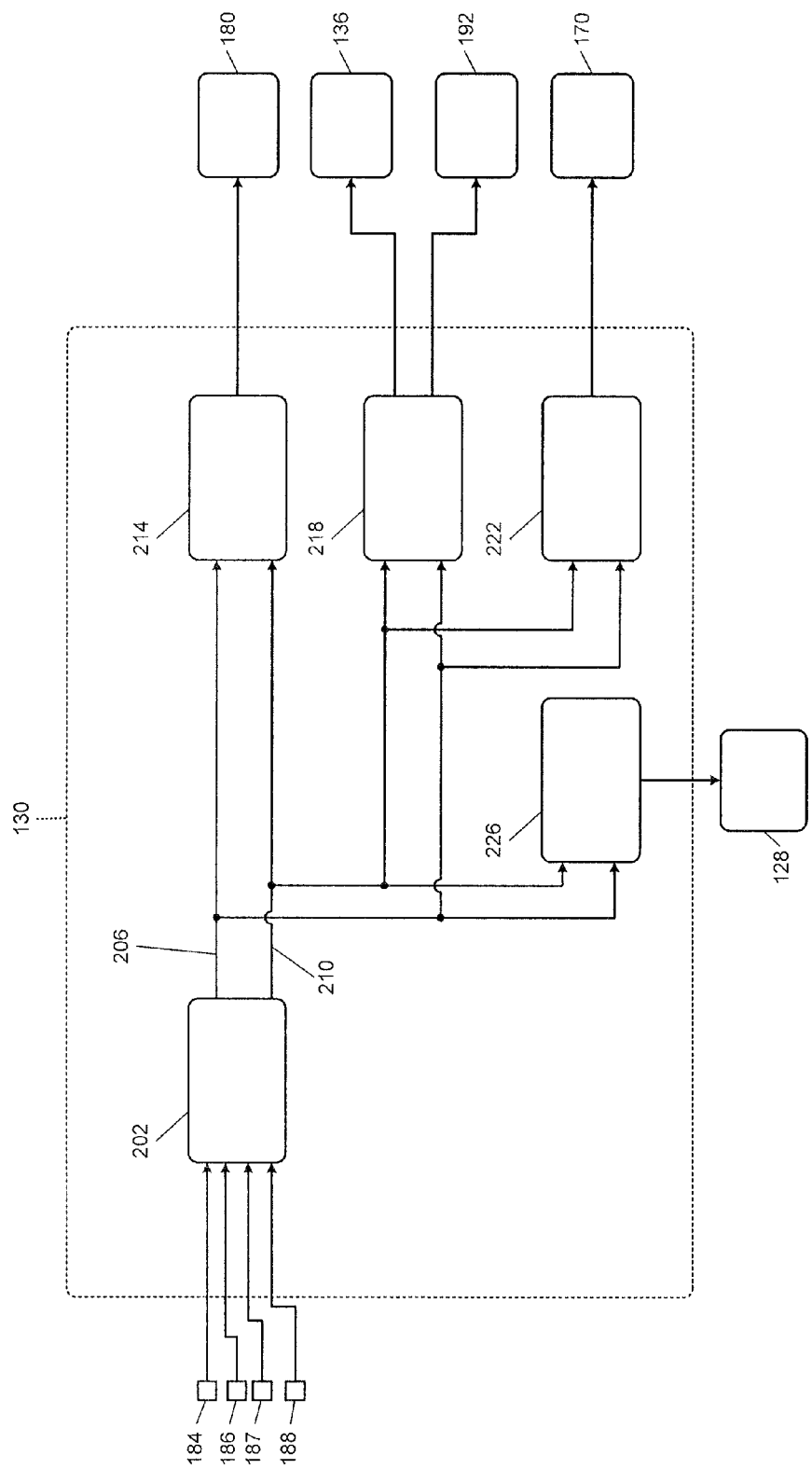
FIG. 3 is a functional block diagram of an example implementation of a driving control module.

Referring now to FIG. 3, an example implementation of the DCM 130 includes a lane boundary module 202. The lane boundary module 202 determines the left and right boundaries of the lane in which the vehicle 110 is traveling.

The lane boundary module 202 determines the left and right boundaries of the lane in which the vehicle 110 is traveling based on images from the forward facing camera 184 and the side facing cameras 186 and 187. For example, the lane boundary module 202 determines the left boundary (i.e., the left lane line) of the lane in which the vehicle 110 is traveling based on images from the forward facing camera 184 and the side facing camera 186. The lane boundary module 202 determines the right boundary (i.e., the right lane line) of the lane in which the vehicle 110 is traveling based on images from the forward facing camera 184 and the side facing camera 186.

Additionally or alternatively to the use of images from the forward facing camera 184, the lane boundary module 202 can determine the left and right boundaries of the lane in which the vehicle 110 is traveling based on images from the rear facing camera 188. For example, the lane boundary module 202 can determine the left boundary (i.e., the left lane line) of the lane in which the vehicle 110 is traveling based on images from the rear facing camera 188 and the side facing camera 186 (and optionally the forward facing camera 184). The lane boundary module 202 can determine the right boundary (i.e., the right lane line) of the lane in which the vehicle 110 is traveling based on images from the rear facing camera 188 and the side facing camera 187 (and optionally the forward facing camera 184).

While the example of the left lane and a left outside rear view mirror will be discussed, the application is also applicable to the right lane line, the side facing camera 187, and the right outside rear view mirror.

To summarize the example of the left lane line, the lane boundary module 202 determines a first linear equation for the left lane based on a location of the left lane line in an image from the forward facing camera 184. The lane boundary module 202 also determines a second linear equation for the left lane based on a location of the left lane line in an image from the side facing camera 186. When a smallest angle between the first and second lines is greater than a predetermined angle, automated control (e.g., of steering, braking, and/or acceleration) based on the location of the lane lines can be disabled. One or more other remedial actions may also be taken, such as storing a predetermined diagnostic trouble code (DTC) in memory, illuminating a malfunction indicator light (MIL), and/or other remedial actions.

As discussed above, the side facing camera 186 is attached to the left outside rear view mirror, such as under the left outside rear view mirror. For example, FIG. 4 includes an example top view including a left side outside rear view mirror 304 of the vehicle and the side facing camera 186 located under the left outside rear view mirror 304.

Figure 4:
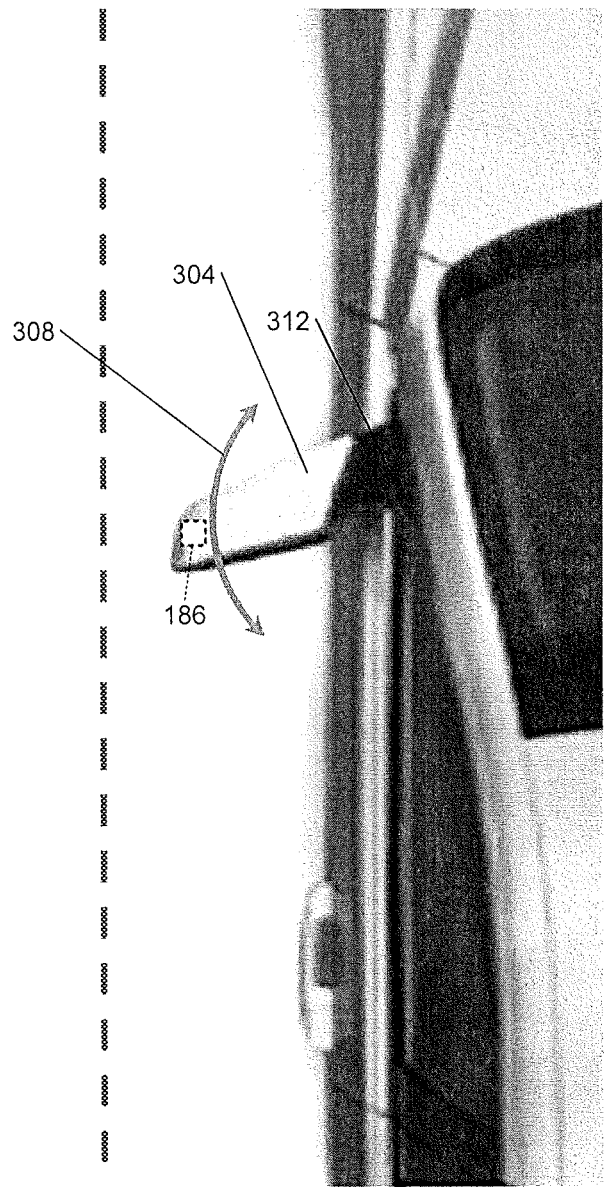
FIG. 4 is an example top view including a side of a vehicle and an outside rear view mirror.

As indicated in FIG. 4 by arrow 308, the left outside rear view mirror 304 can move radially about a pivot point 312. The pivot point 312 is stationary while the left outside rear view mirror 304 moves. The left outside rear view mirror 304 can be moved, for example, in response to the application of physical force to the left outside rear view mirror 304. Some vehicles include a mirror actuator (e.g., electric motor) that moves the left outside rear view mirror 304 based on signals generated by a mirror control module, for example, based on user input.

Figure 5:
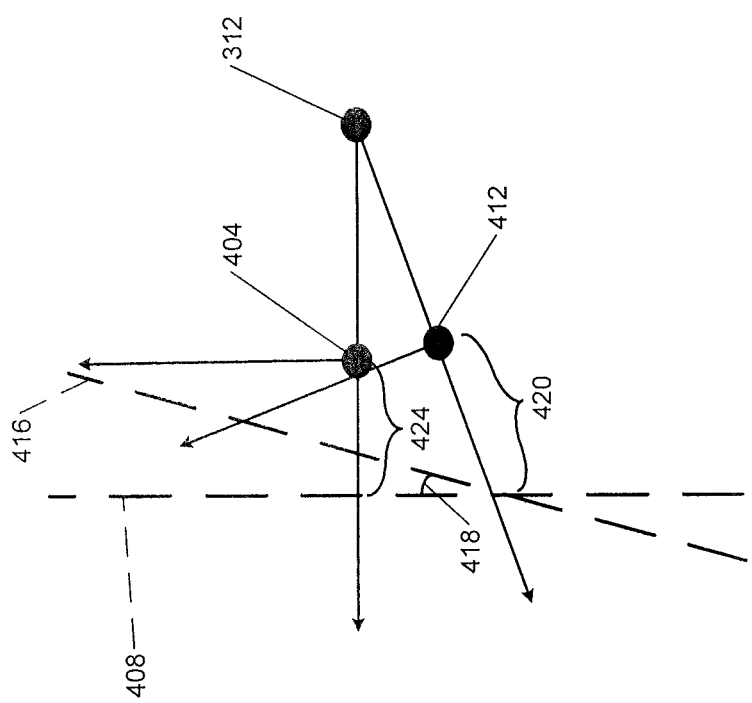
FIG. 5 includes an example diagram illustrating lane lines determined based on different locations of a camera mounted to an outside rear view mirror.

For example, FIG. 5 includes an example illustration of positions of left lane lines determined based on images from the side facing camera 186 for different positions of the left outside rear view mirror 304. Referring now to FIGS. 4 and 5, as discussed above, the left outside rear view mirror 304 moves radially around the pivot point 312. Point 404 (FIG. 5) corresponds to a first or default (or expected) location of the side facing camera 186. A vehicle manufacturer of the vehicle may position the side facing camera 186 at the location 404 before delivery of the vehicle to a dealership or a buyer of the vehicle. Line 408 (FIG. 5) corresponds to a line determined based on one or more images from the forward facing camera 184.

Point 412 (FIG. 5) corresponds to a second location of the side facing camera 186 when the side facing camera 186 has been moved radially about the pivot point 312 toward the rear of the vehicle. While the example of rearward movement is provided, the side rear view mirror (and therefore the side facing camera 186) can also move forward, tilt upward, and tilt downward. The side facing camera 186 may move, for example, in response to physical contact, such as by a human, by a car wash, or by one or more other types of objects. Line 416 (FIG. 5) corresponds to a line determined based on one or more images from the side facing camera 186 when the side facing camera 186 is at the location 412. Angle 418 corresponds to the angle between the lines 408 and 416.

As illustrated, movement of left outside rear view mirror 304 (FIG. 4), changes the second linear equation for the left lane, which is determined based on a location of the left lane line in an image from the side facing camera 186. As such, movement of the left outside rear view mirror 304 may cause the angle between the first and second lines to be greater than the predetermined angle.

420 (FIG. 5) corresponds to a distance between the side facing camera 186 and the line 416 determined based on one or more images from the side facing camera 186 when the side facing camera 186 is at the location 412. Since the side facing camera 186 pivots about the pivot point 312, the distance between the vehicle and the line 416 can be set based on or equal to (i) a predetermined distance between the vehicle and the side facing camera 186 and (ii) the distance between the side facing camera 186 and the left lane line. 424 (FIG. 5) corresponds to an expected distance between the side facing camera 186 and the line 416 determined based on the expectation of the side facing camera 186 to be at the location 404, such as based on one or more images from the forward facing camera 184.

According to the present application, the lane boundary module 202 determines an angle between lines drawn according to the first and second linear equations. The lane boundary module 202 corrects a distance between the vehicle and the left lane line determined from an image from the side facing camera 186 based on the angle to determine a corrected distance 206 between the vehicle and the left lane line. As such, automated control (e.g., of steering, braking, and/or acceleration) based on the location of the lane lines can continue, even when the angle is greater than the predetermined angle, thereby enhancing system performance and user satisfaction.

Similarly or identically to how the lane boundary module 202 determines the corrected distance 206, the lane boundary module 202 determines a corrected distance 210 between the vehicle and the right lane line based on images from the forward facing camera 184 and the side facing camera 187. One or more actions may be performed based on the corrected distance 206 and/or the corrected distance 210.

For example, a steering control module 214 may adjust the steering actuator 178, thereby adjusting vehicle steering, based on the corrected distance 206 and/or the corrected distance 210. For example only, the steering control module 214 may adjust the steering actuator 178 based on maintaining the corrected distance 206 equal to the corrected distance 210 or based on maintaining the corrected distances 206 and 210 greater than a predetermined distance (e.g., 0 or greater than zero). Additionally or alternatively, an acceleration control module 218 may adjust one or more engine actuators (via the ECM 136) and/or adjust one or more transmission actuators (via the TCM 192) to accelerate or decelerate the vehicle based on the corrected distance 206 and/or the corrected distance 210. The engine actuators may include, for example, the throttle valve 134, the fuel injectors, the spark plugs, camshaft phasers, and/or other types of engine actuators. The transmission actuators may include, for example, gear ratio, one or more clutches, and/or other types of transmission actuators. Additionally or alternatively, a braking control module 222 may apply or release the friction brakes 125 based on the corrected distance 206 and/or the corrected distance 210.

Additionally or alternatively, a driver warning module 226 may activate the driver warning device 128 based the corrected distance 206 and/or the corrected distance 210. For example, the driver warning module 226 may activate the driver warning device 128 when the corrected distance 206 and/or the corrected distance 210 is less than a predetermined distance indicative of a lane departure and a turn signal is not activated. Activation of the driver warning device 128 may include, for example, activating a flashing light, activating a haptic device, and/or outputting an audible warning. One or more other actions may additionally or alternatively be taken based on the corrected distance 206 and/or the corrected distance 210.

While the example of the corrected distances 206 and 210 being distances between the vehicle and the respective lane lines will be discussed, the corrected distances 206 and 210 may alternatively be expressed in terms of distances between the side facing cameras 186 and 187 and the respective lane lines. This is because the distances between the vehicle and the side facing cameras 186 and 187 are fixed.

Figure 6:
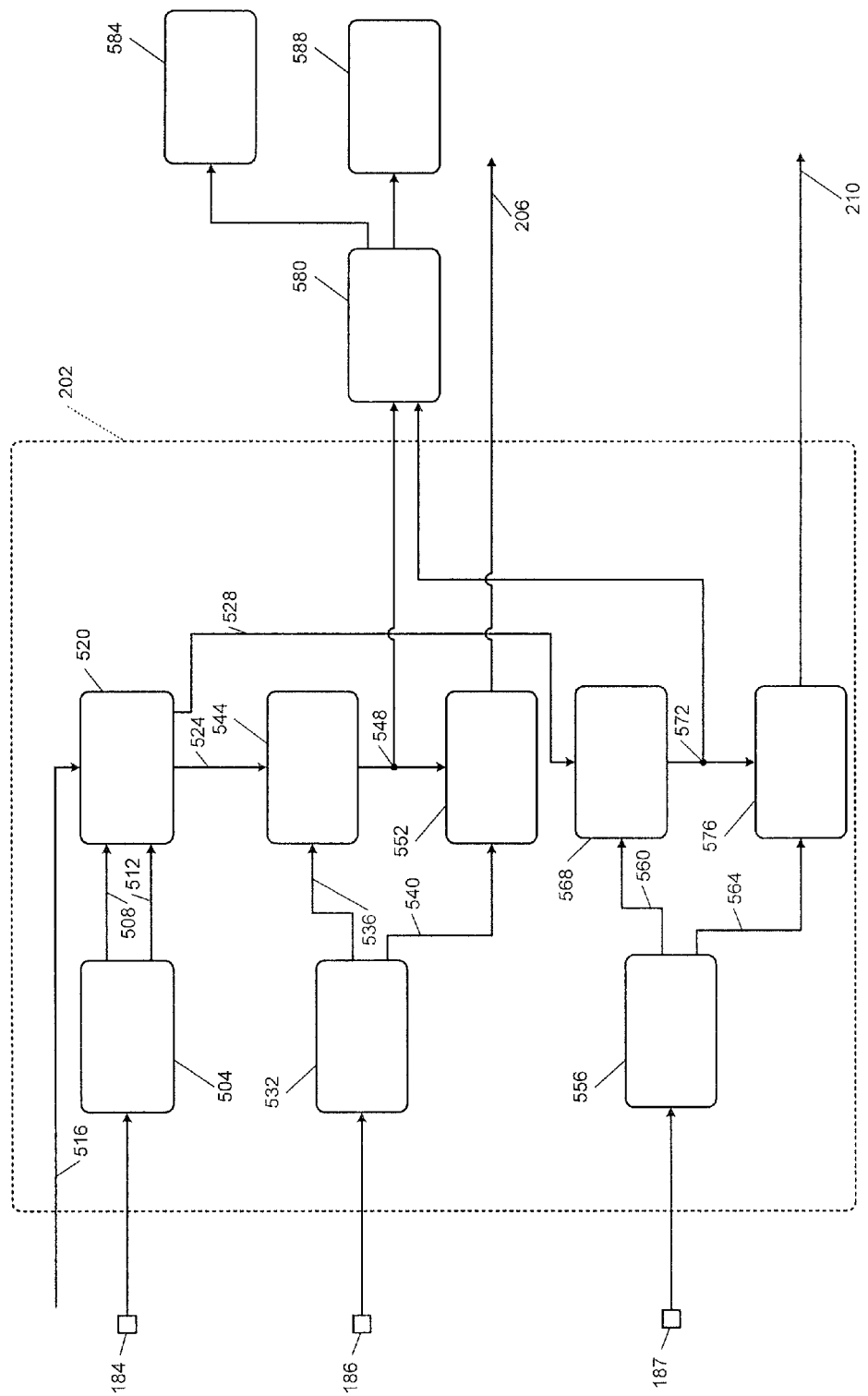
FIG. 6 is a functional block diagram of an example lane boundary module.

FIG. 6 includes a functional block diagram of an example implementation of the lane boundary module 202. The forward facing, side facing, and rear facing cameras 184, 186, 187, and 188 may capture images at one or more predetermined rates. For each image captured by the forward facing camera 184, a line module 504 identifies indicators (e.g., road markings) of the left lane and identifies indicators of the right lane. The line module 504 generates a linear equation 508 for the left lane line for the side facing camera 186 being in the expected position based on the locations of the indicators of the left lane in the image from the forward facing camera 184. The line module 504 may generate the linear equation 508 by fitting a line to the locations of the indicators, for example, using a best fit algorithm. The line module 504 generates a linear equation 512 for the right lane line for the side facing camera 186 being in the expected position of the side facing camera 187 based on the locations of the indicators of the right lane in the image from the forward facing camera 184. The line module 504 may generate the linear equation 512 by fitting a line to the locations of the indicators, for example, using a best fit algorithm. While the example of linear equations will be discussed herein, the present application is also applicable to other types of polynomial equations.

The linear equations 508 and 512 may be provided in terms of X and Y coordinates, for example, relative to the expected position of the side mirrors 186 and 187. The X coordinate indicates a location along the length of a road on which the vehicle 110 is travelling, and the Y coordinate indicates a location along the width of the road.

Since the forward facing camera 184 captures images in front of the vehicle and the side facing cameras 186 and 187 capture images beside the vehicle, it may take a period for portions of the lane lines imaged by the forward facing camera 184 to be imaged by the side facing cameras 186 and 187. The period may be a function of, for example, vehicle speed 516. The vehicle speed 516 may be determined and provided by the TCM 192, for example, as described above. A delay module 520 stores the linear equations 508 and 512 and outputs stored ones of the linear equations 508 and 512 determined the period earlier as delayed linear equations 524 and 528, respectively.

For each image captured by the side facing camera 186, a line module 532 identifies indicators (e.g., road markings) of the left lane. The line module 532 generates a linear equation 536 for the left lane line for the side facing camera 186 being in its actual position based on the locations of the indicators of the left lane in the image from the side facing camera 186. The line module 532 may generate the linear equation 536 by fitting a line to the locations of the indicators, for example, using a best fit algorithm. The linear equation 536 may be provided in terms of X and Y coordinates, for example, relative to the actual position of the side facing camera 186. The X coordinate indicates a location along the length of a road on which the vehicle 110 is travelling, and the Y coordinate indicates a location along the width of the road.

The line module 532 also determines a distance 540 between the vehicle and the left lane line. The line module 532 may determine the distance 540, for example, by solving the linear equation 536 to determine the X coordinate with Y equal to zero. The line module 532 may also add (to the X coordinate) the predetermined distance between the vehicle and the side facing camera 186. Alternatively, the distance 540 between the side facing camera 186 and the left lane line may be used.

An angle module 544 determines an angle 548 between the line corresponding to the delayed linear equation 524 for the left lane line (determined by the line module 504) and the line corresponding to the linear equation 536. For example, the angle module 544 may determine the slopes from the delayed linear equation 524 and the linear equation 536, determine the arctangents of each slope to determine the angle of inclination of each of the lines, subtract the two angles of inclination, and solve for the smallest (acute) angle.

A correction module 552 determines the corrected distance 206 based on the distance 540 and the angle 548. For example, the correction module 552 may set the corrected distance 206 based on or equal to $$d*\cos(\theta),$$

where d is the distance 540, cos represents the cosine function, and θ is the angle 548.

For each image captured by the side facing camera 187, a line module 556 identifies indicators (e.g., road markings) of the right lane. The line module 556 generates a linear equation 560 for the right lane line for the side facing camera 187 being in its actual position based on the locations of the indicators of the right lane in the image from the side facing camera 187. The line module 556 may generate the linear equation 560 by fitting a line to the locations of the indicators, for example, using a best fit algorithm. The linear equation 560 may be provided in terms of X and Y coordinates, for example, relative to the actual position of the side facing camera 187. The X coordinate indicates a location along the length of a road on which the vehicle 110 is travelling, and the Y coordinate indicates a location along the width of the road.

The line module 556 also determines a distance 564 between the vehicle and the right lane line. The line module 556 may determine the distance 564, for example, by solving the linear equation 560 to determine the X coordinate with Y equal to zero. The line module 556 may also add (to the X coordinate) the predetermined distance between the vehicle and the side facing camera 187. Alternatively, the distance 564 between the side facing camera 187 and the left lane line may be used.

An angle module 568 determines an angle 572 between the line corresponding to the delayed linear equation 528 for the right lane line (determined by the line module 504) and the line corresponding to the linear equation 560. For example, the angle module 568 may determine the slopes from the delayed linear equation 528 and the linear equation 560, determine the arctangents of each slope to determine the angle of inclination of each of the lines, subtract the two angles of inclination, and solve for the smallest (acute) angle.

A correction module 576 determines the corrected distance 210 based on the distance 564 and the angle 572. For example, the correction module 576 may set the corrected distance 210 based on or equal to $$d*\cos(\theta),$$

where d is the distance 564, cos represents the cosine function, and θ is the angle 572.

While the example of the use of the forward facing camera 184 is provided, the rear facing camera 188 could be used in place of the forward facing camera 184. Alternatively, both the forward facing camera 184 and the rear facing camera 188 could be used, for example, by duplicating the 504, 520, 544, 552, 568, and 576 for the inclusion of the rear facing camera 188. In this example, the corrected distance 206 and the corrected distance 210 may be determined based on the use of both the forward facing and rear facing cameras 184 and 188. For example, the outputs from both instances of 552 may be averaged to determine the corrected distance 206, and the outputs from both instances of 576 may be averaged to determine the corrected distance 210.

In various implementations, the vehicle may include a mirror control module 580. The mirror control module 580 selectively actuates a left mirror actuator 584 (e.g., an electric motor or other electrical actuator) to actuate the left outside rear view mirror based on the angle 548. For example, the mirror control module 580 may actuate the left mirror actuator 584 to actuate the left outside rear view mirror to adjust the angle 548 toward or to zero. The mirror control module 580 selectively actuates a right mirror actuator 588 (e.g., an electric motor or other electrical actuator) to actuate the right outside rear view mirror based on the angle 572. For example, the mirror control module 580 may actuate the right mirror actuator 588 to actuate the right outside rear view mirror to adjust the angle 572 toward or to zero.

Figure 7:
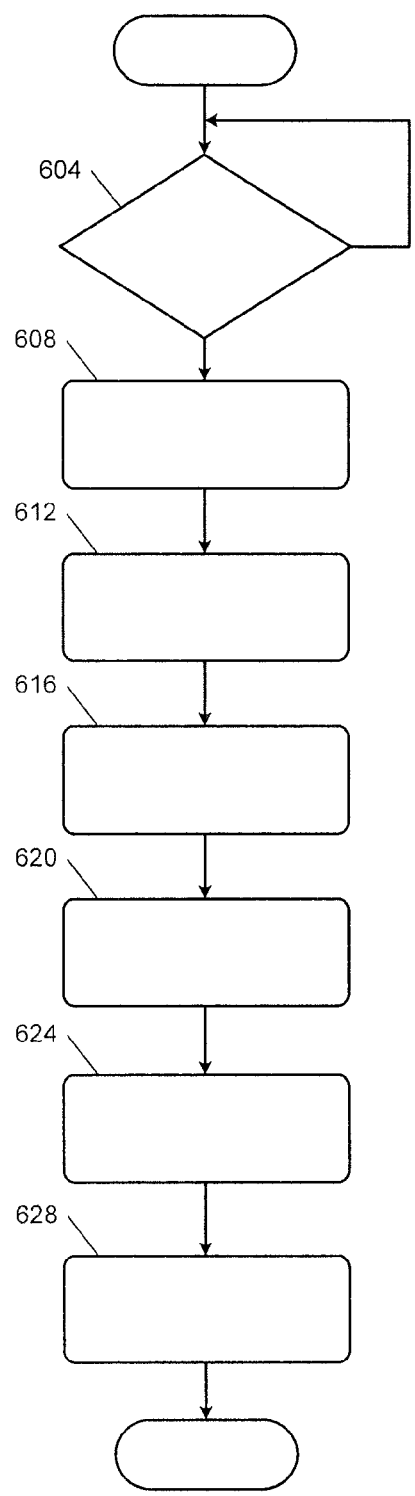
FIG. 7 is a flowchart depicting an example method of correcting distances to the right and left lane lines based on actual locations of right and left side facing cameras and selectively adjusting one or more vehicle actuators based on the corrected distances.

FIG. 7 is a flowchart depicting an example method of correcting distances to the right and left lane lines and selectively adjusting one or more vehicle actuators based on the corrected distances. Control begins with 604 where the line modules 504, 532, and 556 determine whether the forward facing and side facing cameras 184, 186, and 187 have captured new images. The forward facing and side facing cameras 184, 186, and 187 capture new images at a predetermined rate. If 604 is true, control continues with 608. If 604 is false, control may remain at 604.

At 608, the line module 504 determines the linear equations 508 and 512 for the left and right lane lines, respectively, based on the expected locations of the side facing cameras 186 and 187, respectively, and the image from the forward facing camera 184. The line module 504 may store the linear equations 508 and 512. The line modules 532 and 556 also determine the linear equations 536 and 560 at 608 for the left and right lane lines, respectively, based on the images from the side facing cameras 186 and 187. The images from the side facing cameras 186 and 187, however, come from the actual locations of the side facing cameras 186 and 187.

At 612, the line modules 532 and 556 determine the distances 540 and 564. The line modules 532 and 556 may determine the distances, for example, by solving the linear equations 536 and 560 for X where Y is equal to zero. At 616, the delay module 520 may determine the delayed linear equations 524 and 528. For example, the delay module 520 may determine a delay period between the when the lane lines in the image from the forward facing camera 184 will be imaged in the images from the side facing cameras 1856 and 187 based on the vehicle speed, for example, using one of a function and a lookup table that relates vehicle speeds to delay periods. The delay module may select the stored ones of the linear equations 508 and 512 from the delay period prior as the delayed linear equations 524 and 528. In various implementations, field of views (FOVs) of the front and side facing cameras 184, 186, and 187 may overlap such that storage and application of the delay period is omitted. In other words, the side facing cameras 186 and 187 may image portions of the left and right lane lines contemporaneously with the forward facing camera 184.

At 620, the angle modules 544 and 568 determine the angles 548 and 572, respectively. The angle module 544 determines the angle between the lines corresponding to the linear equation 536 and the delayed linear equation 524. The angle module 568 determines the angle between the lines corresponding to the linear equation 560 and the delayed linear equation 528.

At 624, the correction modules 552 and 576 determines the corrected distances 206 and 210 based on the distances 540 and 564 and the angles 548 and 572, respectively. At 628, one or more vehicle actuators may be adjusted based on the corrected distance 206 and/or the corrected distance 210. For example, the steering control module 214 may adjust the steering actuator 178 based on the corrected distance 206 and/or the corrected distance 210. Additionally or alternatively, the acceleration control module 218 may adjust one or more engine and/or transmission actuators based on the corrected distance 206 and/or the corrected distance 210. Additionally or alternatively, the brake control module 222 may adjust application of the friction brakes 125 based on the corrected distance 206 and/or the corrected distance 210. Additionally or alternatively, the mirror control module 580 may adjust the left mirror actuator 584 and/or the right mirror actuator 588 based on the angle 548 and/or the angle 572, respectively. While the example of ending is provided, the example of FIG. 7 may be illustrative of one control loop and control may return to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A lane detection system of a vehicle, comprising:
   a first line module configured to:
     identify locations of a lane line included in a first image captured using a first camera capturing images outside of and beside the vehicle, wherein the first camera is mounted to an outside rear view mirror that is movable about a fixed pivot point;
     based on the locations of the lane line included in the first image, determine a first linear equation corresponding to the lane line; and
     determine a distance to the lane line based on the first linear equation;
   a second line module configured to:
     identify locations of the lane line included in a second image captured using a second camera capturing images outside of and in front of the vehicle; and
     based on the locations of the lane line included in the second image, determine a second linear equation corresponding to the lane line;
   an angle module configured to, based on the first and second linear equations, determine an angle between first and second lines corresponding to the first and second linear equations, respectively; and
   a correction module configured to determine a corrected distance to the lane line based on the distance and the angle.

2. The lane detection system of claim 1 further comprising:
   a third line module configured to:
     identify locations of a second lane line included in a third image captured using a third camera capturing images outside of and beside the vehicle, wherein the third camera is mounted to an second outside rear view mirror that is movable about a second fixed pivot point;
     based on the locations of the second lane line included in the third image, determine a third linear equation corresponding to the second lane line; and
     determine a second distance to the second lane line based on the third linear equation,
   wherein the second line module is further configured to:
     identify locations of the second lane line included in the second image captured using the second camera; and
     based on the locations of the second lane line included in the second image, determine a fourth linear equation corresponding to the second lane line;
   a second angle module configured to, based on the third and fourth linear equations, determine a second angle between third and fourth lines corresponding to the third and fourth linear equations, respectively; and
   a second correction module configured to determine a second corrected distance to the second lane line based on the second distance and the second angle.

3. The lane detection system of claim 1 further comprising a steering control module configured to selectively adjust a steering actuator of the vehicle based on the corrected distance.

4. The lane detection system of claim 1 further comprising a mirror control module configured to selectively move the outside rear view mirror about the fixed pivot point based adjusting on the angle between first and second lines corresponding to the first and second linear equations, respectively, toward zero.

5. The lane detection system of claim 1 further comprising an engine control module configured to selectively adjust an engine actuator of the vehicle based on the corrected distance.

6. The lane detection system of claim 1 further comprising a brake control module configured to selectively adjust application of friction brakes of the vehicle based on the corrected distance.

7. The lane detection system of claim 1 wherein the second line module is configured to determine the second linear equation further based on an expected location of the first camera.

8. The lane detection system of claim 1 wherein the second line module is configured to determine the second linear equation further based on a delay period between when a portion of the lane line is included in the second image and when the portion of the lane line is included in the first image.

9. The lane detection system of claim 1 wherein first line module is configured to determine the distance to the lane line further based on a predetermined distance between a side of the vehicle and a location of the first camera.

10. The lane detection system of claim 1 further comprising a driver warning module configured to, based on the corrected distance, selectively generate at least one of an audible, a visual, and a tactile output.

11. A lane detection method for a vehicle, comprising:
   identifying locations of a lane line included in a first image captured using a first camera capturing images outside of and beside the vehicle, wherein the first camera is mounted to an outside rear view mirror that is movable about a fixed pivot point;
   based on the locations of the lane line included in the first image, determining a first linear equation corresponding to the lane line;
   determining a distance to the lane line based on the first linear equation;
   identifying locations of the lane line included in a second image captured using a second camera capturing images outside of and in front of the vehicle;
   based on the locations of the lane line included in the second image, determining a second linear equation corresponding to the lane line;

based on the first and second linear equations, determining an angle between first and second lines corresponding to the first and second linear equations, respectively; and determining a corrected distance to the lane line based on the distance and the angle.

12. The lane detection method of claim 11 further comprising:

identifying locations of a second lane line included in a third image captured using a third camera capturing images outside of and beside the vehicle, wherein the third camera is mounted to an second outside rear view mirror that is movable about a second fixed pivot point;

based on the locations of the second lane line included in the third image, determining a third linear equation corresponding to the second lane line;

determining a second distance to the second lane line based on the third linear equation;

identifying locations of the second lane line included in the second image captured using the second camera;

based on the locations of the second lane line included in the second image, determining a fourth linear equation corresponding to the second lane line;

based on the third and fourth linear equations, determining a second angle between third and fourth lines corresponding to the third and fourth linear equations, respectively; and determining a second corrected distance to the second lane line based on the second distance and the second angle.

13. The lane detection method of claim 11 further comprising selectively adjusting a steering actuator of the vehicle based on the corrected distance.

14. The lane detection method of claim 11 further comprising selectively moving the outside rear view mirror about the fixed pivot point based adjusting on the angle between first and second lines corresponding to the first and second linear equations, respectively, toward zero.

15. The lane detection method of claim 11 further comprising selectively adjusting an engine actuator of the vehicle based on the corrected distance.

16. The lane detection method of claim 11 further comprising selectively adjusting application of friction brakes of the vehicle based on the corrected distance.

17. The lane detection method of claim 11 wherein determining the second linear equation includes determining the second linear equation further based on an expected location of the first camera.

18. The lane detection method of claim 11 wherein determining the second linear equation includes determining the second linear equation further based on a delay period between when a portion of the lane line is included in the second image and when the portion of the lane line is included in the first image.

19. The lane detection method of claim 11 wherein determining the distance to the lane line includes determining the distance to the lane line further based on a predetermined distance between a side of the vehicle and a location of the first camera.

20. The lane detection method of claim 11 further comprising, based on the corrected distance, selectively generating at least one of an audible, a visual, and a tactile output.

* * * * *